United States Patent [19]

Rogers

[11] 4,046,962
[45] Sept. 6, 1977

[54] CALLED PARTY FRAUD DETECTION IN AN AUTOMATED COIN SYSTEM

[75] Inventor: Barry William Rogers, Geneva, Ill.

[73] Assignee: Bell Telephone Laboratories, Incorporated, Murray Hill, N.J.

[21] Appl. No.: 720,158

[22] Filed: Sept. 3, 1976

[51] Int. Cl.² ............................................. H04M 1/66
[52] U.S. Cl. ............................ 179/6.3 R; 179/18 DA
[58] Field of Search ................... 179/63 R, 6.31, 6.4, 179/6.5, 7.1 R, 18 DA, 84 VF

[56] References Cited

U.S. PATENT DOCUMENTS

| | | | |
|---|---|---|---|
| 2,676,209 | 4/1954 | Joel, Jr. | 179/6.3 R |
| 3,069,502 | 12/1962 | Edstrom et al. | 179/6.3 R |
| 3,428,751 | 2/1969 | Edington | 179/6.3 R |
| 3,453,389 | 7/1969 | Shaer | 179/7.1 R |
| 3,760,104 | 9/1973 | Thompson et al. | 179/6.3 R |
| 3,952,160 | 4/1976 | Pasternack et al. | 179/18 DA |
| 4,001,513 | 1/1977 | Naylor | 179/18 DA |
| 4,002,848 | 1/1977 | Stein | 179/18 DA |

Primary Examiner—Kathleen H. Claffy
Assistant Examiner—Gerald L. Brigance
Attorney, Agent, or Firm—M. S. Landis

[57] ABSTRACT

This invention pertains to systems servicing coin operated telephones and, more specifically, to apparatus in such systems for detecting when called parties fraudulently generate coin deposit tones to simulate the coin deposit tones which should be received from a calling coin station. During intermediate coin deposit intervals, the network connection between the calling and called stations is split. A first coin tone detector is connected to the calling station portion while a second coin tone detector is connected to the called station portion. Logic is responsive to the detection of coin tones by these detectors for indicating whether a detected coin tone is valid or fraudulent.

14 Claims, 9 Drawing Figures

FIG. 5

| | COIN DEPOSIT TONE DETECTOR CTD1 | COIN DEPOSIT TONE DETECTOR CTD2 | SIGNAL COMPARATOR SGL | ACTION |
|---|---|---|---|---|
| NO COIN | | | | |
| COIN | 0 | 0 | — | NO COIN |
| NO INTERFERENCE | | | | |
| OPERATOR SPEECH (GOOD LOOP) | 1 | 1 | (VC) | COIN |
| OPERATOR SPEECH (POOR LOOP) | 1 | 0 | (VC) | COIN |
| CALLED PARTY SPEECH (GOOD LOOP) | 0 | 1 | — | NO COIN |
| CALLED PARTY SPEECH (POOR LOOP) | 0 | 0 | | COIN |
| OPERATOR & CALLED PARTY SPEECH | 0 | 0 | | NO COIN |
| FRAUD | | | | |
| (GOOD LOOP) | 1 | 0 | $(\overline{VC})$ | FRAUD |
| (POOR LOOP) | 1 | 1 | $(\overline{VC})$ | FRAUD |

0 = NO RESPONSE : $(\overline{N})(\overline{D})(\overline{Q})$
1 = RESPONSE : $(N)+(D)+(Q)$

CALLED PARTY FRAUD DETECTION IN AN AUTOMATED COIN SYSTEM

FIELD OF THE INVENTION

This invention relates to systems operable with coin telephones and, more specifically, to apparatus for detecting the generation of coin deposit tones at a called station. Even, more specifically, this invention relates to apparatus for detecting fraudulent tones in the presence of reflected coin tones which echo from the telephone switching offices, and also in the presence of voice signals from the calling party, the called party, and sometimes even announcements from operators or other automated circuitry.

BACKGROUND OF THE INVENTION AND PRIOR ART

An essential part of each coin operated telephone is apparatus responsive to the deposit of a coin for generating signals indicative of the value of the deposit. In one prior art coin telephone, each deposited coin strikes a distinctive gong or a chime. The sound generated thereby is converted to an electrical signal by a transducer and applied to the telephone line. An operator interprets the various sounds to determine the value of the deposited coins.

In another prior art coin operated telephone station, a switching device is included which operates one or more times in response to the deposit of each coin. Each switch operation is indicative of an incremental coin value such as 5 cents. Each operation of the switch energizes an oscillator that generates an electrical signal burst in the audible frequency range. These bursts are counted by the operator to determine the value of the coin deposited. A system of this type is disclosed in E. R. Andregg et al., U.S. Pat. No. 3,146,312, issued Aug. 25, 1964.

Operators working with the above-described coin identification systems are sometimes confused as to whether signals generated at a TOUCH-TONE® signal dial are dial signals or coin deposit signals. Unfortunately, certain telephone users attempt to fool the operator into thinking that the requisite coins have been deposited by depressing certain combinations of the pushbuttons to generate series of single frequency tones.

J. E. Edington, U.S. Pat. No. 3,428,751, issued Feb. 18, 1969, discloses one prior art arrangement that allows the operator to distinguish dial signals from coin deposit signals. In the Edington arrangement, a distinctive single frequency guard tone is provided at the termination of each dial signal. Thus, if an operator hears this guard tone, he or she then realizes that the preceding tone was generated from the pushbuttons rather than from the deposit of coins. The Edington arrangement appears to be effective in preventing the use of a TOUCH-TONE signaling dial to generate coin deposit signals.

Other prior art arrangements have attempted to automate the coin deposit detection functions normally performed by the operator. One such automated prior art system is disclosed in A. E. Joel, Jr., U.S. Pat. No. 2,676,209, issued Apr. 21, 1954. In this system, each coin station includes signal generators controlled by coin deposits for transmitting combinations of two frequencies which identify the type of coin deposited, i.e., a nickel, a dime, or a quarter. These distinctive frequency combinations were detected by a tone detector and when the requisite coins were deposited, the call was completed without operator intervention.

Another fully automated prior art coin system is disclosed in N. R. Shaer, U.S. Pat. No. 3,453,389, issued July 1, 1969. The Shaer system is incorporated in a larger partially automated traffic service position system (TSPS) disclosed in R. J. Jaeger, Jr. et al., U.S. Pat. No. 3,484,560, issued Dec. 16, 1966. This TSPS is hereinafter described in greater detail in conjunction with the present invention.

In the Shaer system the coin stations were modified as disclosed in the above-mentioned E. R. Andregg et al. patent. Now a number of tone pulses were generated for each deposited coin. One tone pulse was generated for a deposit of a nickel, two pulses for a dime, and five pulses for a quarter. Coin tone receivers were provided for detecting these series of tone pulses to identify the coin deposited in the coin station. When the requisite deposit was detected, the call was completed without operator intervention.

In still another prior art automated coin system as disclosed in copending application Ser. No. 689,600 filed May 24, 1976 by R. M. Dudonis, which issued on June 21, 1977, as U.S. Pat. No. 4,031,324, (entitled Automated Coin Arrangement Provided Interference Free Coin Deposit Detection During Announcements), voice and other coin deposit signals received from a calling coin station are segregated from the automated announcements applied to the calling coin station. Thus, the coin tone detector can detect coin deposit tones even during announcements without any interference therewith.

The above-mentioned prior art arrangements provide varying amounts of protection against fraud perpetrated by a subscriber at the calling coin station. Some of these arrangements are effective in preventing or at least indicating the existence of fraudulently generated coin deposit signals during the initial coin deposit period in which an initial deposit is made prior to completion of the requested connection. However, all the above arrangements are susceptible in the varying extents to coin deposit signals fraudulently generated by the called station during intermediate coin deposit intervals. These intermediate coin deposit intervals are those deposit intervals in which both called and calling stations are connected together. More specifically, if the call is directed from a calling coin station to a called coin station, then coins deposited in the called coin station during intermediate coin deposit intervals may generate the same coin deposit signals as coins deposited in the calling coin station. Prior art detection equipment or an operator cannot distinguish between called station generated coin deposit signals and calling station generated coin deposit signals. Since coins can only be collected in the calling coin station, any coins deposited in the called coin station will not be collected and, accordingly, can be easily recovered by the called subscriber. Thus, the called subscriber has fraudulently derived free telephone service.

Moreover, in calls directed from a calling coin station to a regular called station, coin deposit signals can be acoustically coupled through the called station to the receiving apparatus to simulate valid coin deposit signals. Thus, apparently valid coin deposit signals can be generated at the called station and applied over the network connection during intermediate coin collection intervals to derive free use of the telephone network in these prior art systems.

Copending application Ser. No. 698,186, filed on June 21, 1976 by R. M. Dudonis, C. G. Morrison, R. L. Potter and K. Streisand, which issued on June 21, 1977, as U.S. Pat. No. 4,031,325, (entitled Called Party Fraud Prevention In An Automated Coin System), recognized the problem of called party coin tone fraud, and utilizes hybrid circuits and a notch filter to prevent the detection of fraudulent coin tones under certain circumstances. Hereinafter, this application will be called Dudonis et al. as distinguished from the previously mentioned Dudonis application.

In addition to preventing the simulation of valid coin deposit tones by the called station, it is also desirable to detect coin fraud so that the fraudulent call can be terminated immediately if necessary. Moreover, it is also desirable to record the station numbers associated with the calling and called stations so that the perpetrators can be apprehended.

It is an object of my invention to detect attempts by a called party to obtain free telephone service by simulating coin deposit signals.

It is a further object of my invention to detect, as well as to prevent, called party fraud in automated systems for detecting coin deposit signals.

It is a further object of my invention to detect called party fraud in the presence of echos, calling party speech, called party speech and "operator" speech.

SUMMARY OF THE INVENTION

In accordance with one illustrative embodiment of my invention during intermediate coin deposit intervals, the communication path between the calling and called stations is split into distinct portions. A first coin deposit tone detector is connected to the calling station portion to detect valid coin deposit tones originating at the calling coin station. A second coin deposit tone detector is connected to the called station portion to detect fraudulent coin deposit tones generated by the called station.

In another illustrative embodiment of my invention, the split portions are reconnected utilizing isolation means or hybrid circuits to segregate signals being conveyed from the calling station to the called station from signals being conveyed from the called station to the calling stations. A distinct coin deposit tone detector is connected to each of these segregated paths to respectively detect coin signals from the calling and called stations. Due to impedance mismatches, it is possible for a portion of coin deposit tones to be reflected back to the detectors from the local office. To prevent called station generated tones from being reflected back from the local office and appearing as valid tones from the calling station, a filter is inserted in the segregated path conveying signals from the called to the calling stations in order to attenuate a specific frequency in coin deposit tones.

In another illustrative embodiment of my invention, a first tone detector is connected to the communication path between the calling and called stations to detect signals originating from the called station. A second tone detector detects coin tones originated at both the calling and called stations. Signal comparator circuitry compares the levels of the detected coin tones to differentiate reflected tones from those tones directly received from a station. Fraud detection logic is responsive to both the detectors and to the signal comparator logic for ascertaining whether a detected tone is valid or fraudulent. More specifically, this embodiment allows the detection of coin deposit tones during the presence of varying types of interfering signals such as speech from the calling station, the called station or the operator (or automated announcement circuit).

Thus, in accordance with one feature of my invention, distinct coin deposit tone detectors respectively monitor tones from the calling and called stations to identify valid as well as fraudulent coin tones.

In accordance with another feature of my invention, logic is provided to differentiate between valid and fraudulent coin tones based upon whether or not one or both detectors detect a particular coin tone.

In accordance with still another feature of my invention, signal comparator logic compares the relative strengths of coin tones detected by the detectors to ascertain whether the detected tones were directly received from a station or whether the detected tones actually are fraudulent tones reflected back to the detector.

BRIEF DESCRIPTION OF THE DRAWING

The forgoing as well as other objects, features and advantages of my invention will be more apparent from the description of the drawing in which:

FIG. 5 illustrates a coin detector truth table which will be explained with regard to the operation of the embodiment in FIG. 4;

GENERAL DESCRIPTION

Figure 1:
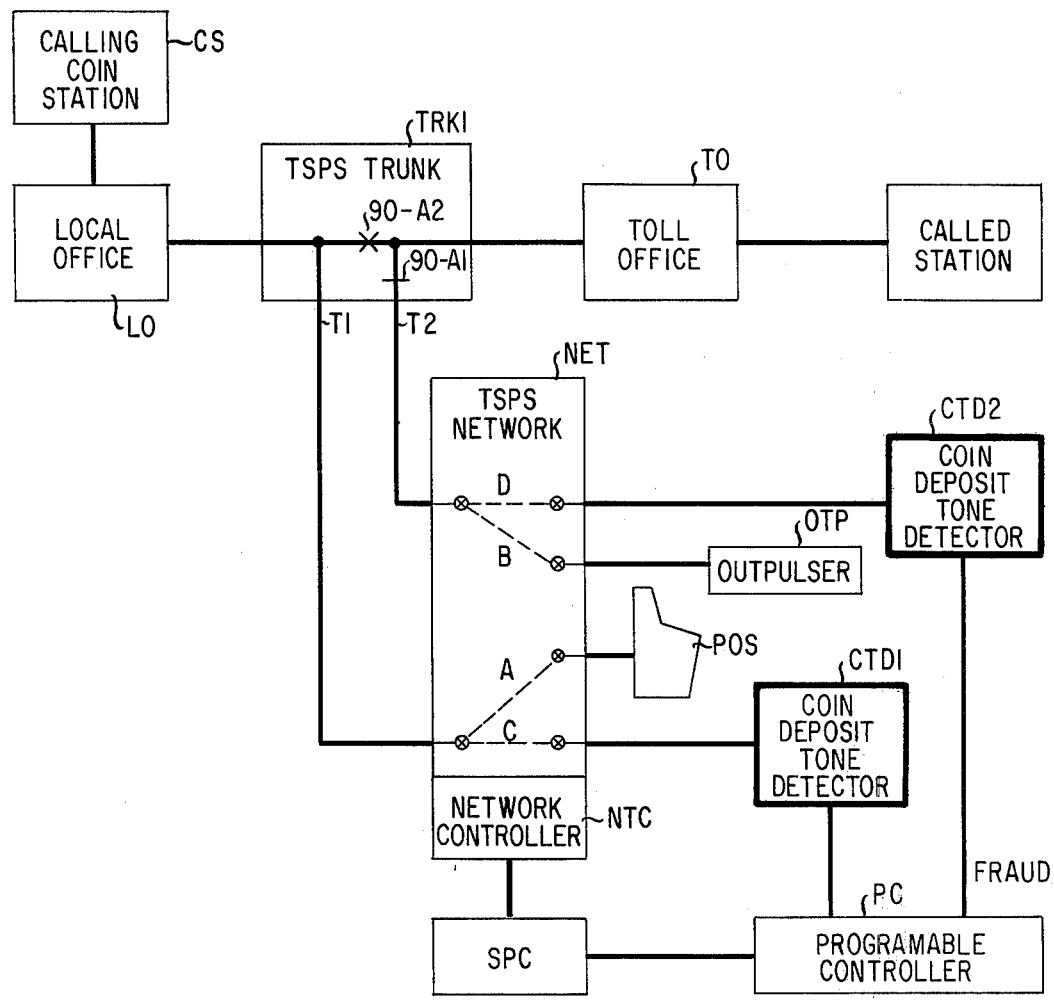
FIG. 1 illustrates one illustrative embodiment of my invention and its incorporation into an existing traffic service position system (TSPS)

FIG. 1 illustrates how an existing TSPS system is modified in accordance with the principles of my invention. The existing TSPS system will be described herein only to the extent necessary to fully understand the principles of my invention. For further details on TSPS, the above-mentioned R. J. Jaeger, Jr. et al. patent or the Dec. 16, 1966, and the Dec. 1970 issues of the *Bell System Technical Journal* can be consulted.

1. Prior Art TSPS System

With the advent of TSPS, many of the functions previously performed by an operator at a cordboard were automated. More specifically, a customer at a coin station CS would make an initial deposit and then dial a 1 followed by 7 or 10 digits. The local office LO routes the call to a TSPS trunk TRK1 and down conductors T1 to the TSPS network NET. Stored program controller SPC which is a duplicated processing unit for performing arithmetical and logical functions on data in accordance with its stored program, controls network controller NTC to establish a connection to a digit receiver (not shown). The local office transmits the calling and called digits to the digit receiver via conductor T1 in the normal manner. The TSPS rates the call and displays the charge and initial period to an operator at a position such as position POS. A new network connection A is then established between conductors T1 and position POS by TSPS network NET. While the operator at position POS informs the calling party of the requisite coin deposit, outpulser OTP is controlled by the SPC to outpulse the digits in the called number via path B and conductors T2 to toll office TO. When the calling subscriber deposits coins at station CS, distinctive tones are generated thereat indicating the type of coin deposit, i.e., nickel, dime, quarter. While the customer is depositing the coins and while the operator is listening for the coin deposit tones, the toll office TO establishes the call to the called station in the normal manner. When outpulsing to the toll office is completed, the call is cut through by trunk TRK1 directly from the local office LO to the toll office TO.

At the end of the initial period, TSPS trunk TRK1 is connected via conductors T1 back to an operator's position POS (or any other idle position). The operator, during this intermediate deposit period, then informs both parties that the initial period has ended and to signal at the end of the call. The operator's position is then released and the call is again directly routed via trunk TRK1. If the subscribers do not go on-hook after the last announcement, then the call continues. The operator is again reconnected to the calling station via conductors T1 at the end of the call and requests additional overtime charges and then listens for the deposit of additional coins at coin station CS. If a long period of time elapses, the operator may be reconnected to collect further deposits during intermediate coin deposit periods before allowing the call to continue. During these deposit intervals the operator is not able to distinguish between valid coin deposit signals from the calling station and fraudulent coin deposit signals from the called station.

2. Coin Detection During Intermediate Coin Deposit Intervals

This invention pertains to detecting coin deposit tones during intermediate coin deposit intervals. These intermediate coin deposit intervals are defined to be those intervals in which coins are collected while a communication path is still established between the calling coin station and the called station or, in other words, deposit intervals in which signals can be received from both the calling and called stations. These intermediate coin deposit intervals are distinguished from the initial coin deposit interval in that during the initial interval only the calling coin station is connected to a coin detection system.

In the prior art TSPS system, the operator was unable to distinguish between coin tones received from the calling coin station and coin tones received from the called station. This was true because the operator was linked to both stations via the T1 leads. However, in accordance with the principles of my invention during intermediate coin deposit intervals, the SPC releases a relay in trunk TRK to split the network connection and controls network controller NTC to establish connections C and D. Now the calling coin station is connected to coin deposit tone detector CDT1 via leads T1 and network connection C, and the called station is connected to coin deposit tone detector CTD2 via the T2 leads, closed contact 90-A1, and connection D. Contact 90-A2 in trunk TRK1 splits the connection between the calling and called stations, and thereby isolates the stations. Detector CDT1 monitors coin deposit tones received from the calling station whereas detector CDT2 monitors coin deposit tones received from the called station. These coin deposit tones comprise bursts of dual frequency tones (1700 and 2200 hertz; one burst is generated at the coin station when a nickel is deposited, two bursts are generated for a dime, and five bursts for a quarter. The detection of any such coin deposit burst by detector CTD2 is indicative of a fraud situation since coin tones are being received from the called station. Programmable controller PC is alerted thereof over symbolic lead FRAUD. Programmable controller PC then alerts the SPC, which in turn, connects operator's position POS to the connection by establishing connection A. The SPC also operates the relay in trunk TRK to reconnect the calling and called stations via contact 90-A2. The operator then requests the calling party to redeposit the coins.

A suitable programmable controller PC is described in the above-mentioned Dudonis application. A suitable coin tone detector such as CDT1 and CDT2 is also described in the above-mentioned Dudonis application. Moreover, the manner in which coin tone detector CTD1 communicates with programmable controller PC is described therein in regard to FIGS. 9 and 10. Detector CTD1 in FIG. 1 corresponds to detector DT2 in FIG. 10 of this Dudonis application. The hybrid circuits utilized by Dudonis are not illustrated in FIG. 1 because they are not needed in this one illustrative embodiment of my invention. However, they are described herein in regard to subsequent figures.

The structure in FIG. 1, while advantageously detecting fraudulent coin tones from the called station, also isolates the calling and called stations. The calling party may believe that the connection has been knocked down and may refuse to pay the requested charges. Thus, under certain circumstances this isolation is not fully desirable.

Figure 2:
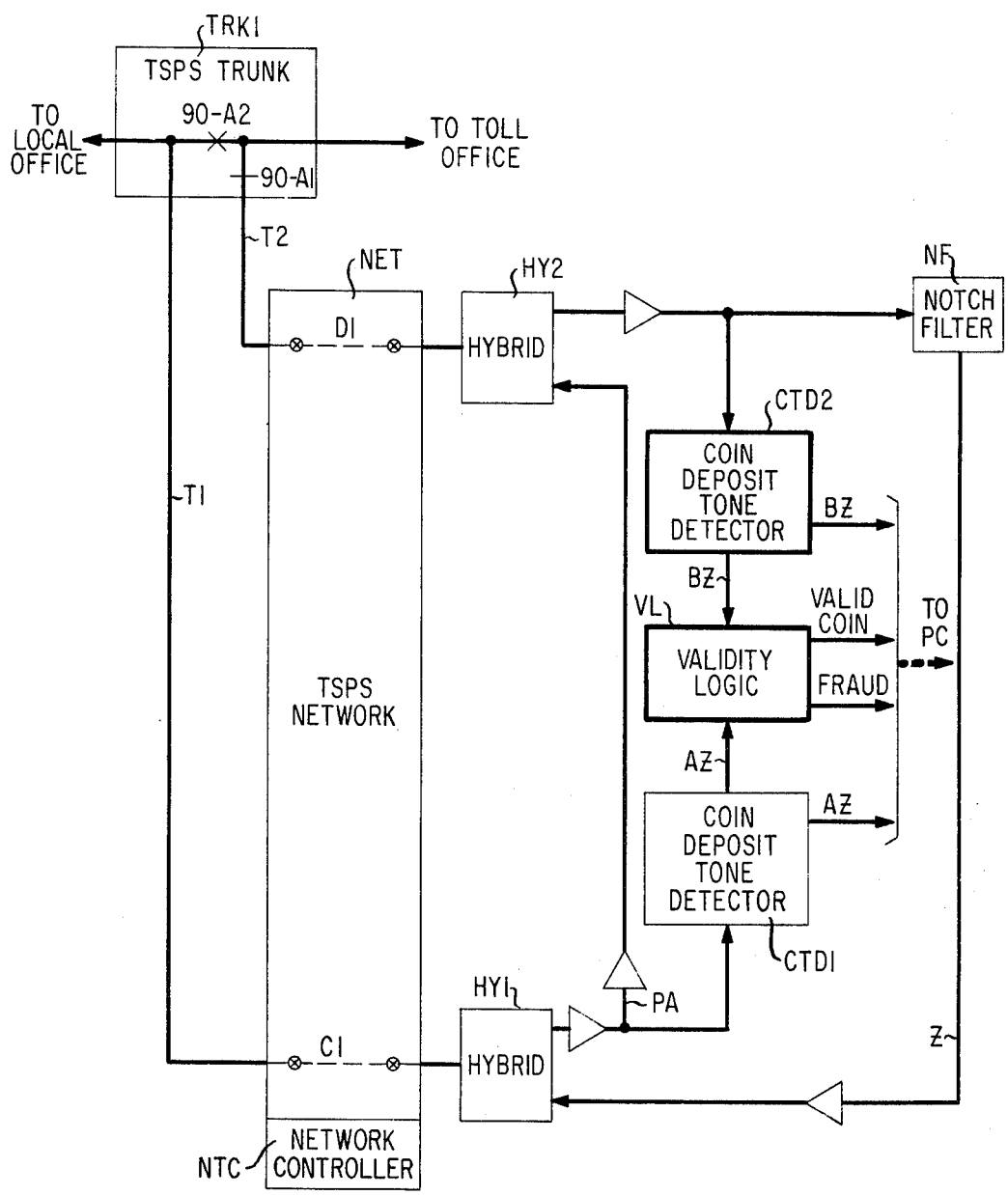
FIG. 2 illustrates another illustrative embodiment of my invention also included in a TSPS system.

FIG. 2 illustrates another illustrative embodiment of my invention which beneficially allows the detection of fraudulent coin deposit tones from the called station. In this embodiment, the calling and called stations can still communicate with each other during intermediate coin deposit intervals.

To elaborate, hybrid circuits HY1 and HY2 segregate the signals from the calling and called stations over separate paths. The calling station communicates with the the called station during intermediate coin deposit intervals over the following path: local office LO, trunk TRK1, leads T1, network connection C-1, hybrid circuit HY1, path PA, hybrid circuit HY2, connection D-1, leads T2 and trunk TRK1 which is connected to the called station via toll office TO. The called station communicates with the calling station via the following path: toll office TO, trunk TRK1, leads T2, connection D-1, hybrid circuit HY2, notch filter NF, path Z, hybrid HY1, connection C-1 and leads T1 which are connected to the calling coin station via trunk TRK1 and local office LO. Coin deposit tones originating at the calling station are detected by tone detector CTD1 in the normal manner through its connection to path PA. These coin tones continue through hybrid HY2 to the toll office TO. Due to possible impedance mismatches at the toll office, a portion of these coin deposit tones may be reflected back to trunk TRK1 and these reflected tones appear as though they originated at the called station. Thus, reflected tones may be detected by coin deposit tone detector CTD2. Thus, valid coin deposit tones may be detected by either detector CTD1, or by detector CTD1 and detector CTD2.

Figure 6:
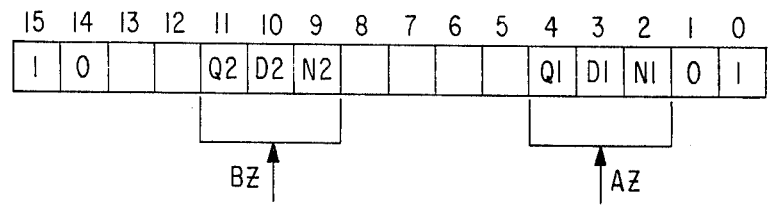
FIG. 6 illustrates one data format which may be utilized by the coin detectors in FIG. 2 to report coin detection information to the programmable controller.

FIG. 6 illustrates one data format in which coin information from the two detectors could be transmitted back to the programmble controller. More specifically, the register depicted in FIG. 6 corresponds to register XDT in FIG. 10 of the above-mentioned Dudonis application. This register is not physically altered, but instead some of the unused bit positions therein now store information pertaining to the second coin detector. To elaborate, bits 2-4 correspond to identical bits in the Dudonis application where N1, D1 and Q1 respectively indicate that a nickel, dime or quarter has been detected by detector CTD1.

FIG. 6 also illustrates bits in register XDT which are set by coin detector CTD2, namely bits 9-11. Each of these bits 9 to 11 corresponds to its counterpart bits 2 to 4. However, the state of each group of bits is independently determined by the associated coin tone detectors.

The information in register XDT in FIG. 6 is periodically interrogated by the programmable controller in a manner identical to that described in the Dudonis application. The controller then performs rudimentary logical operations on the information to determine whether a valid or fraudulent coin has been detected. A valid nickel is identified by the expression (N1) + (N1) (N2), which is logically equivalent to (N1). A fraudulent nickel is identified by the expression (NT) (N2). The logical expressions for dime and quarter deposits are analogous.

Figure 7:
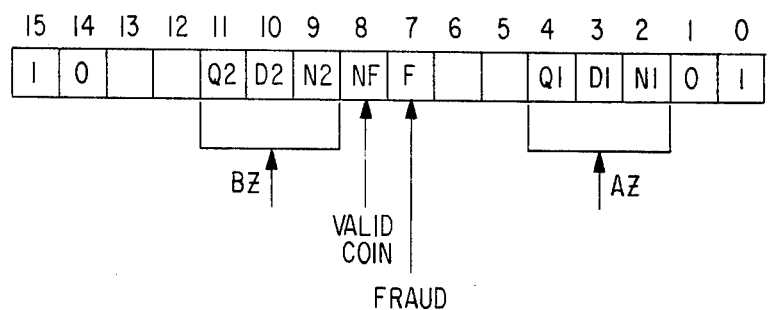
FIG. 7 illustrates another data format which may be utilized by the circuitry in FIG. 2 to report to the programmable controller whether or not the detected coin was valid or fraudulent.

As shown in FIG. 2, distinct auxiliary hardware can also be provided to perform the logical checks performed by the controller as described above. Validity logic VL is responsive to indications AZ and B2 and generates a high signal on lead Valid Coin, if lead N1, D1 or Q1 is high, in accordance with the previous logical expressions. With reference to FIG. 7, a one is inserted in bit position NF, if the detected coin is valid. Even though both detectors may have detected the valid coin, only the coin information detected by detector CTD1 is utilized by the programmable controller in further processing of the call. FIG. 7 illustrates the relative bit positions in register XDT when validity logic VL is utilized to augment the logical processing.

Fraudulent coin deposit tones generated at the called station are received over the T2 leads and are detected by detector CTD2 in FIG. 2 which then forces lead N2, D2 or Q2 to go high. Notch filter NF attenuates the 2200 hertz component of the fraudulent coin deposit tones. These tones, as attenuated, are further applied over path Z, hybrid HY1, connection C-1 and leads T1 to the local office. Due to impedance mismatches at the local office, a portion of these fraudulent tones may be reflected back to trunk TRK1 where the reflected tones appear as though they originated at the calling station. However, because the 2200 hertz component of these tones has been severely attenuated, the tones will not be detected by detector CTD1. Thus leads N1, D1 and Q1 will remain low. Validity logic VL, responsive to the high states of N2, D2 or Q2 and the low states of N1, D1 and Q1, generates a high output on lead FRAUD. Thus, the F bit in FIG. 7, is forced high. When programmable controller PC receives the data word in FIG. 7, the high state of the F lead will indicate that fraudulent tones were detected. Programmable controller PC will then alert the SPC which will then permanently record the numbers associated with the calling station and the called station, and an operator will be connected to handle this situation.

The utilization of hybrid circuits HY1 and HY2 and notch filter NF in FIG. 2 is described in some detail in the above-mentioned Dudonis et al. application. This application teaches the utilization of the notch filters to prevent the detection of fraudulent coin deposit tones generated by the called station. In this embodiment of my invention, in addition to merely preventing the registration of fraudulent tones as valid tones, I benefically provide detector CTD2 and validity logic VL to distinguish between valid and fraudulent coin deposits. Thus, in addition to preventing the registration of fraudulent coin tones, my invention also allows the detection of such fraudulent tones so that an operator, for example, can be immediately alerted to this fraud problem.

Figure 3:
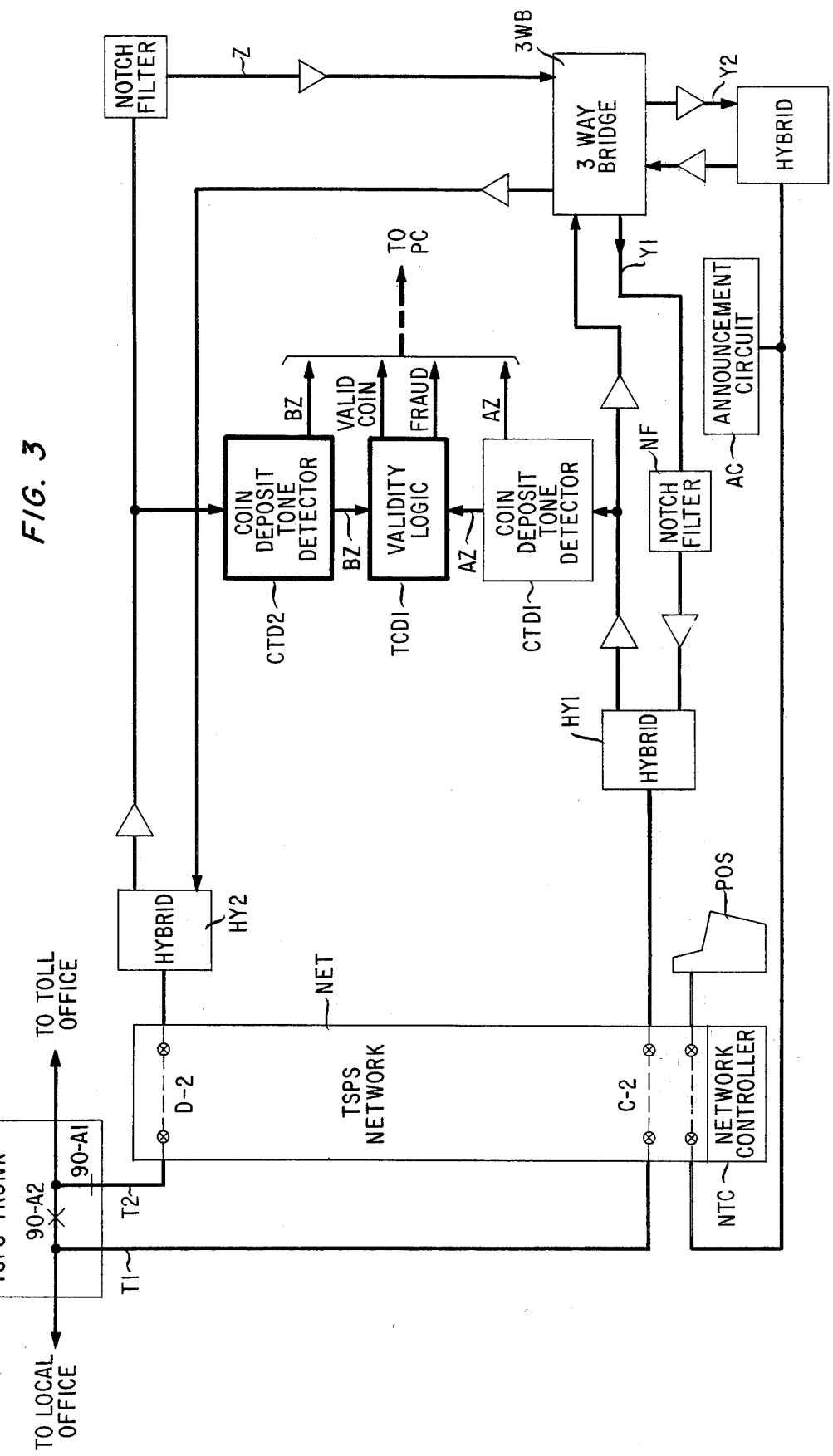
FIG. 3 illustrates another illustrative embodiment of my invention in a TSPS.

FIG. 3 illustrates another illustrative embodiment of my invention. In this embodiment, a three-way bridge is provided so that an operator at position POS can speak to the calling and called stations, and also automated announcements generated by announcement circuit AC can be applied to the stations. More specifically, three-way bridge 3WB is adapted to apply signals received at any one of its three input ports to the output leads of the other two ports. Thus, for example, signals received from the called station, and received over lead Z are outputted by bridge 3WB onto leads Y1 and Y2. Notch filter NF has been relocated between hybrid HY1 and bridge 3WB so that in addition to attenuating the 2200 hertz component of signals received from the called station, it also attenuates this component in announcements received from position POS or circuit AC. The coin deposit tone detectors CTD1 and CTD2 in FIG. 3, perform and function in a manner identical to that previously described in regard to FIG. 2. Except for the utilization of detector CTD2 and validity logic VL, the operation of the circuitry in FIG. 3 is described in detail in the above-mentioned Dudonis et al. application.

Figure 4:
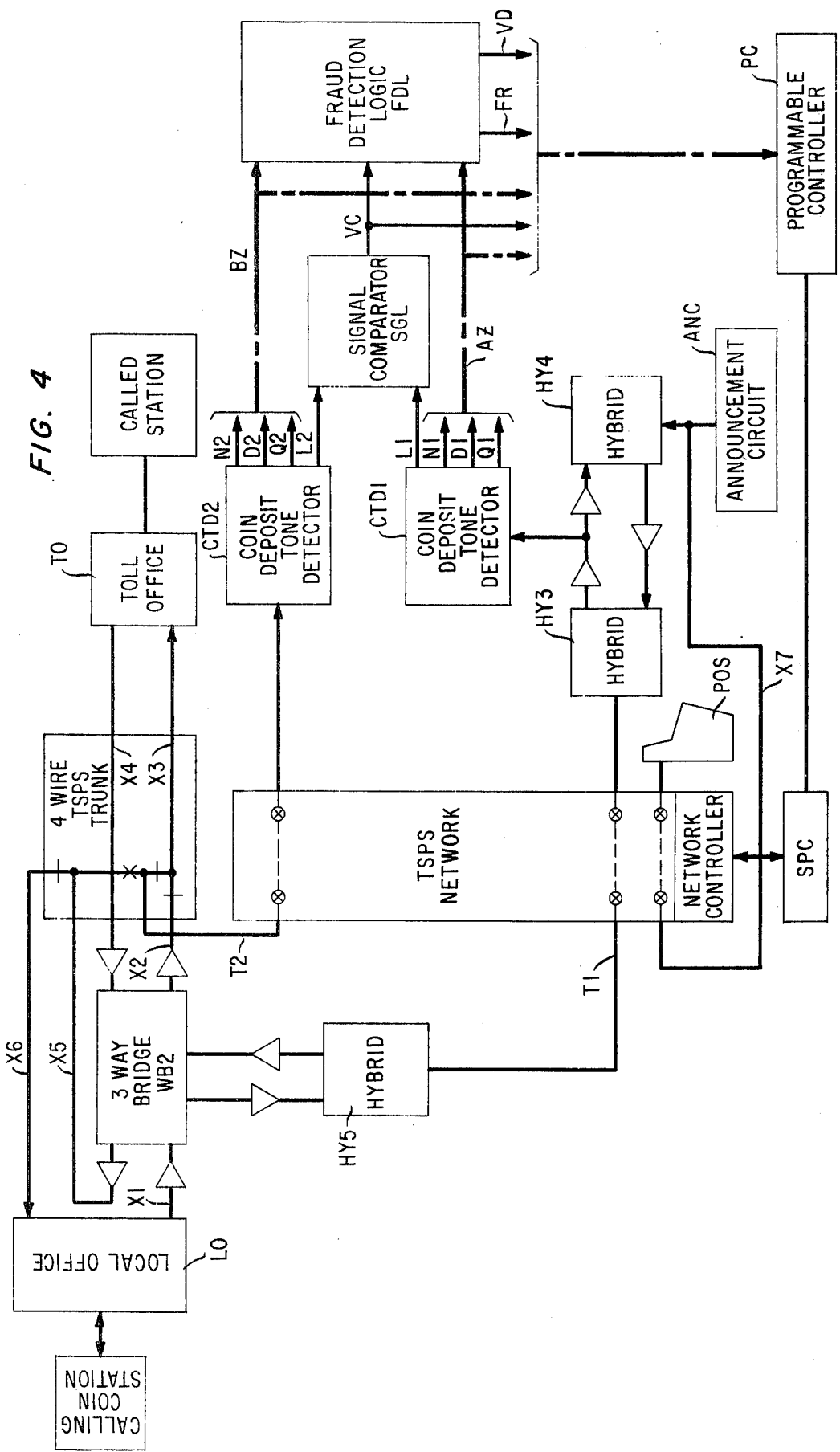
FIG. 4 illustrates another illustrative embodiment of my invention which is adapted to work with four-wire TSPS trunks.

FIG. 4 illustrates another illustrative embodiment of my invention adapted to operate with a well known four-wire TSPS trunk TRK2. Such trunks are described in the above-mentioned Jaeger et al. patent. The structure previously described in regard to FIG. 3 is highly effective with the two-wire TSPS trunk. However, it is not usable with the four-wire TSPS trunk because the communication paths in the four-wire trunk are not split. Thus, during intermediate coin deposit intervals, the calling and called stations can still communicate directly through the trunk and associated circuitry. For example, the calling coin station communicates with the called station over the following path: local office LO, leads X1, bridge WB2, path X2, path X3 and toll office TO. In the opposite direction the called station communicates with the calling station over the following path: toll office TO, path X4, bridge WB2, path X5, path X6 and local office LO.

In this one illustrative embodiment of my invention, two coin deposit tone detectors are provided as explained hereinafter more fully. Detector CTD1 is responsive to signals from both the calling station and the called station. Detector CTD2 is responsive to signals from the calling station and the operator (or announcement circuit) but not directly to signals from the called station. To elaborate, detector CTD1 receives signals from both the calling and called parties via bridge WB2, hybrid HY5, leads T1 and hybrid HY3. Detector CTD2 is connected via leads T2 to leads X3 to received signals from the calling station as well as from the operator (or announcement circuit ANC). Signals received from the operator are applied at position POS to leads X7, and further applied by hybrid circuits HY4 and HY3 to the T1 leads. Announcements from circuit ANC are also applied to the T1 leads over a similar route. Bridge WB2 applies the announcements or operator speech to leads X5 and X2 so the operator can speak to both the calling and called stations.

A fully successful automated coin system must be able to detect coins during announcements and during speech from the calling and called stations. The system must also be capable of detecting coin deposit signals of widely varying amplitudes, such amplitude variations being a normal occurrence in a practical telephone system. Furthermore, in order to prevent responses to other than coin deposit signals, the system should monitor the energy at frequencies other than the coin tone frequencies. When this energy is sufficiently high, detector operation should be inhibited. Moreover, this automated coin system should also be able to detect fraudulent coin deposit tones generated at the called station. Such goals are made even more difficult to achieve because of the different return losses associated with the various calling coin stations. For example, if a particular coin station is serviced by a loop with a poor return loss, then signals being applied to this particular station will be reflected back from the local office toward the TSPS system, to the TSPS to have originated from that station.

In accordance with this embodiment of my invention, signal comparator SGL is provided to compare the relative strengths of received coin deposit tones in order to distinguish between coin deposit tones originated at the calling station and fraudulent coin deposit tones generated at the called station which are reflected back toward the TSPS by the local office LO. More specifically, signal comparator SGL compares the amplitudes of the coin tone signals received by detectors CTD1 and CTD2. Fraudulent coin tone signals transmitted by the called station will be received first by detector CTD1 via toll office TO, leads X4, bridge WB2, hybrid HY5, leads T1 and hybrid HY3. These signals will also proceed from bridge WB2 towards the calling station via leads X5 and X6. If the calling station is served by a loop with a poor return loss, these signals will be reflected back towards detector CTD2 via leads X1, bridge WB2, leads X2 and T2. However, the signals will be significantly reduced in amplitude during this process, permitting signal comparator SGL to detect this situation FIG. 5 illustrates a truth table which indicates the various interference and fraud possibilities and indicates the basis for distinguishing coins from speech signals, and also for distinguishing valid coin tones from fraudulent coin tones.

The first situation shown in the truth table is when no coin is deposited. Neither detector CTD1 or CTD2 detects a coin as indicated by the 0's in the truth table which correspond to the LOW states of leads N1, D1, Q1, N2, D2 and Q2. In this condition the output of signal comparator logic SGL does not provide any useful information, thus it is called a "don't care" state.

Figure 8:
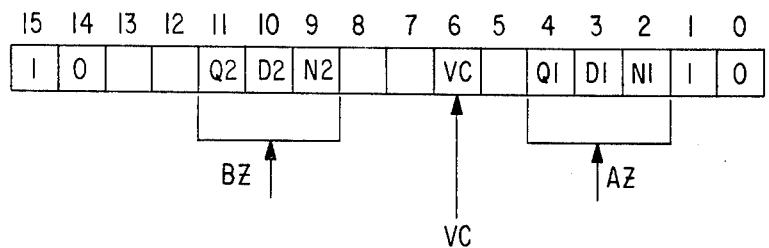
FIG. 8 illustrates the format of data from the circuitry in FIG. 4.

When a coin is deposited at the calling coin station, the resulting 1700 and 2200 hertz tones are applied to each of the tone detectors. The coin tones are transmitted to detector CTD1 over the following path: lead X1, bridge WB2, hybrid HY5, leads T1 and hybrid HY3. The tones are transmitted to detector CTD2 over the following path: lead X1, bridge WB2, lead X2 and leads T2. Each of the tone detectors generates the appropriate N, D, and Q bits previously described. Moreover, they also each include a filter which applies to signal comparator SGL the coin tone frequency components contained within the received signal. In this one illustrative embodiment, only the 2200 hertz frequency component is utilized. The 2200 hertz levels are output by detectors CTD1 and CTD2 over leads L1 and L2, respectively. If the signal level on lead L1 does not exceed the signal level on lead L2 by more than a predetermined threshold (5Db for example), the circuit SGL indicates that the signal levels are equal, and generates a high output on lead VC. Programmable controller PC is responsive to bits N1, D1, Q1, N2, D2, Q2 and VC for ascertaining whether a detected coin tone is valid or fraudulent. FIG. 8 illustrates how register XLD in FIG. 10 of the above-mentioned Dudonis application is loaded with various bits from the tone detectors and the signal comparator circuit. In this situation, both tone detectors have registered the coin deposit signals (as indicated by bit N1, D1 or Q1 and bit N2, S2, or Q2 being high) and the signal levels are equal (as indicated by lead VC being high). This combination is interpreted as a valid coin by programmable controller PC. For example, if a nickel had been deposited then leads N1, N2 and VC would be HIGH.

In the next situation in the truth table of FIG. 5, a coin is deposited at the calling station during operator's speech. In this situation it is further assumed that the loop from the calling coin station to the local office has a good return loss. Therefore, signals to the calling coin station will not be reflected back towards TSPS. Hybrid circuits HY4 and HY3 segregate the operator's speech from position POS from detector CTD1. Therefore, detector CTD1 detects the deposited coin without any interference from the operator's speech and generates a high output on N1, D1 or Q1 depending on the number of detected coin deposit pulses. However, the operator's speech, in addition to being applied by bridge WB2 to the calling and called stations, is also applied over leads T2 to detector CTD2. This speech may block operation of detector CTD2 causing low outputs on N2, D2 and Q2. However, the 2200 hertz component of signals received by each of the detectors should be within 5Db's since the signals are generated by the calling station and neither detected tone is an echo. Therefore, circuit SGL generates a high output on lead VC. Programmable controller PC interprets this combination of signals as a valid coin.

The next situation is similar to the previous situation except that the loop between the calling coin station and the local office LO is now assumed to have a poor return loss. Therefore, speech from the operator will be reflected back to bridge WB2 over leads X1 and applied to detector CTD1 via hybrid HY5, leads T1 and hybrid HY3. This speech may prevent detector CTD1 from detecting the coin tones. Thus detectors CTD1 and CTD2 may both miss the deposited coin.

In the next situation, it is assumed that the called party is speaking during a coin deposit by the calling party. The called party speech is received in bridge WB2 over leads X4, and is applied to detector CTD1 over the previously described path. This speech may prevent detector CTD1 from detecting the coin tones and low outputs will be produced on N1, D1 and Q1. Detector CTD2 does not receive the speech if the calling station is served by a loop with a good return loss. Accordingly, this detector will detect the coin tones and a high output will be produced on N2, D2 or Q2. Programmable controller PC interprets this combination of signals as a valid deposit. For example, $\overline{D1}$, D2 indicates a valid coin deposit signal identifying a dime.

If in the prior situation, the calling coin station was served by a loop with a poor return loss, then the speech from the called station would echo back and possibly prevent detector CTD2 from detecting the coin. When the system is unable to detect the deposit of a coin, an operator at position POS is connected to the call after a 6 second time-out period as described in the above-mentioned Dudonis application. The operator can then return the deposited coins to the customer, and ask that the coins be redeposited.

If the operator and the called party are both speaking while a coin is being deposited by the calling party, then it is possible that neither detector would detect the coin tones.

The preceding has described how coin tones generated at the calling coin station are detected during different levels and sources of interference. The following will describe how fraudulent coin deposit tones generated at the called station are detected by the detectors and distinguished from valid coin deposits by the associated logic.

More specifically, fraudulent coin tones are received by detector CTD1 over the following: path X4, bridge WB2, hybrid HY5, leads T1 and hybrid HY3. If the loop associated with the calling coin station has a good return loss then the fraudulent tones will not be reflected back. Thus, detector CTD2 will not detect a coin tone, and accordingly, its N2, D2 and Q2 bits will be zero. Signal comparator circuit SGL will generate a low output on lead VC because the 2200 hertz components of the signals detected by the detectors will not be within 5Db's. Programmable controller PC responsive to the high state of bit N1, D1 or Q1 the low state of leads N2, D2 and Q2, and the low state of lead VC will interpret this combination as a fraudulent coin deposit tone. Programmable controller PC then notifies the SPC so that a record can be made of the numbers of the calling and called stations and so that an operator can be connected to the stations and request that all coins be redeposited.

If the calling coin station in the above example was served by a loop with a poor return loss, then fraudulent coin deposit tones would echo back to detector CTD2. Each detector would detect the coin tones and thus generate a high output on its respective N, D or Q lead. However, the signal level of the reflected tone will be considerably below the level of the tone directly received from the called station. Accordingly, circuit SGL will generate a low output on lead VC. Programmable controller PC interprets this combination of signals as a fraud condition.

To summarize the above-described truth table, programmable controller PC registers a valid nickel deposit in accordance with the logical expression (N1) (N2) (VC) + (N1) $(\overline{N2})$ (VC) + $(\overline{N1})$ (N2), which is equivalent to (N1) (VC) + $(\overline{N1})$ (N2). The logical expressions for valid dime and quarter deposits are analogous. Programmable controller PC registers a fraudulent nickel deposit in accordance with the logical expression (N1) $(\overline{N2})$ $(\overline{VC})$ + (N1) (N2) $(\overline{VC})$, which is equivalent to (N1) $(\overline{VC})$. The logical expressions for fraudulent dime and quarter deposits are analogous.

With reference to the truth table and the above-described equations, the detection of a coin, free of any interference and the detection of fraud with a poor loop are very similar in that both detectors detect coins. However, for a valid coin, circuit SGL indicates that the signal strengths are approximately the same at 2200 hertz whereas for fraudulent tones, this circuitry indicates that the signal levels are not equal.

Figure 9:
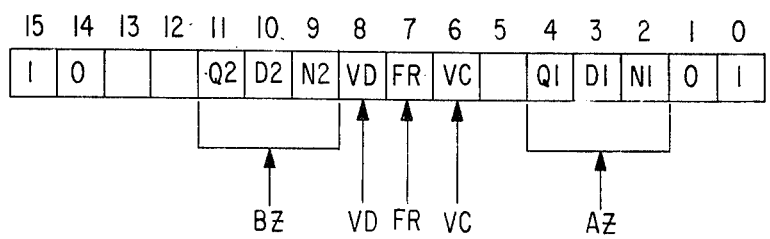
FIG. 9 illustrates another data format which may be utilized by the circuitry in FIG. 4 to report to the programmable controller whether or not the detected coin was valid or fraudulent.

The detection of a valid coin during operator speech with a good loop also appears to be very similar to the detection of fraud with a good loop. However, again signal comparator circuit SGL is able to distinguish valid coin tones from fraudulent coin tones based upon the relative strength of signals received by the tone detectors. Thus, the ability to distinguish direct signals from reflected signals beneficially allows the detection of fraud situations otherwise undetectable. As shown in FIG. 4, distinct auxiliary hardware can also be provided to perform the logical checks performed by the controller as described above. Fraud detection logic FDL is responsive to indication S N1, D1, Q1, N2, D2, Q2 and VC and generates a high on lead VD for a valid coin, and a high on lead FR for a fraudulent coin, in accordance with the truth table of FIG. 5 and the previous logical expressions. FIG. 9 illustrates the relative bit positions in register XDT when fraud detection logic FDL is utilized to augment the logical processing.

Although the invention and numerous features thereof have been described in connection with four illustrative embodiments thereof, it is to be understood that additional applications and embodiments which will be obvious to those skilled in the art are included within the spirit and scope of the invention as defined by the following claims.

What is claimed is:

1. In a telephone system wherein a calling coin station and a called station are interconnected via a communication path, fraud detection and coin deposit detection apparatus, which comprises:
   means for splitting the communication path into a first portion connected to the calling station and into a second portion connected to the called station,
   a first coin tone detector connectable to said first portion for monitoring signals received from the calling station and indicating the presence of coin deposit signals, and
   a second coin tone detector connectable to said second portion for monitoring signals received from the called station and for generating an alarm if coin deposit signals are detected therefrom.

2. In the telephone system according to claim 1, said fraud detection and coin deposit detection apparatus further comprising:
   network means controllable for establishing a connection between said first portion and said first coin tone detector and a connection between said second portion and said second coin tone detector, and
   control means for controlling said splitting means to split the communication path and for controlling said network means to establish the last-named connections during a coin deposit interval.

3. In a telephone system wherein a calling coin station and a called station are interconnected in a trunk circuit intermediate a local office and a toll office, fraud detection and deposit apparatus, which comprises:
- switch means in the trunk circuit for splitting the interconnection into a first portion connected to the calling station and into a second portion connected to the called station,
- a network connected to each of said portions,
- first and second coin deposit tone detectors connected to said network,
- first control means during a coin deposit interval for controlling said network to establish a connection between said first portion and said first coin deposit tone detector and a connection between said second portion and said second coin deposit tone detector and for controlling said switch means to split the interconnection, and
- second control means connected to said first and second coin deposit tone detectors for counting the coins detected by said first coin deposit tone detector and for generating an alarm if coin tones are detected by said second coin deposit tone detector.

4. In a telephone system wherein a calling coin station and a called station are interconnected by a communication path therebetween, fraud detection and coin deposit detection apparatus, which comprises:
- isolation means connected in the communication path for providing a first path for conveying signals received from the calling station to the called station and a second path for conveying signals received from the called station to the calling station,
- a first coin tone detector connected to said first path for detecting coin deposit signals received over said first path,
- a second coin tone detector connected to said second path for detecting coin deposit signals received over said second path, and
- logic means responsive to said first and second coin tone detectors for generating a fraud indication if a coin deposit signal is detected by said second coin tone detector and not by said first coin tone detector.

5. In the telephone system according to claim 4, said fraud detection and coin deposit detection arrangment further comprising:
- a filter in second path to distort coin deposit signals conveyed over said second path to the calling station,
- and wherein said logic means also indicates a valid coin if said first coin tone detector detects a coin deposit signal or if said first and second coin tone detectors both detect a coin deposit signal.

6. In the telephone system according to claim 4, said fraud detection and coin deposit detection apparatus wherein said isolation means comprises a pair of hybrid circuits with said first and second paths therebetween.

7. In a telephone system wherein a calling coin station and a called station are interconnected in a trunk circuit intermediate a local office and a toll office, fraud detection and coin deposit detection apparatus, which comprises:
- switch means in the trunk circuit for splitting the interconnection into a first portion connected to the calling station and into a second portion connected to the called station,
- first and second hybrid circuits having first and second unidirectional paths therebetween,
- a network controllable to connect said first portion to said first hybrid circuit and to connect said second portion to said second hybrid circuit, said first unidirectional path conveying signals from said first portion received via said first hybrid circuit to said second hybrid circuit, and said second unidirectional path conveying signals from said second portion received via said second hybrid circuit to said first hybrid circuit,
- a first coin tone detector connected to said first unidirectional path and detecting coin deposit tones received thereover,
- a filter in said second unidirectional path for distorting coin deposit tones received thereover, a second coin tone detector connected to said second unidirectional path between said second hybrid circuit and said filter and detecting coin deposit tones received over said second unidirectional path, and
- logic means connected to said first and second coin tone detectors for generating a fraud indication if a coin tone is detected by said second coin tone detector and not by said first coin tone detector, and for generating a valid coin indication if a coin tone is detected by only said first coin detector or by both said first and second coin tone detectors.

8. In the telephone system according to claim 7, said fraud detection and coin deposit detection apparatus further comprising:
- means for controlling said switch means and said network during a coin deposit interval to split the interconnection and to connect said first and second portions to said first and second hybrid circuits, respectively.

9. In the telephone system according to claim 7, said fraud detection and coin deposit detection apparatus further comprising:
- bridge means connected to said first and second unidirectional paths, and
- announcement circuit means connected to said bridge for applying announcement thereto,
- said bridge means applying said announcements over said first unidirectional path to said second hybrid circuit, second portion and called station, and also applying said announcements over said second unidirectional path to said first hybrid circuit, first portion and calling station.

10. In a telephone system wherein a calling coin station and a called station are interconnected by a communication path therebetween, fraud detection and coin deposit detection apparatus, which comprises:
- isolation means in the communication path for providing a first path indicating signals apparently directed from the calling station to the called station and for providing a second path indicating both the signals apparently directed from the calling station to the called station and signals apparently directed from the called station to the calling station,
- first coin detector means connected to said first path for generating a first coin present indication (CTD1) upon the detection of a coin deposit signal indicated over said first path,
- second coin detector means connected to said second path for generating a second coin present indication (CTD2) upon the detection of a coin deposit signal indicated over said second path,
- signal comparator means jointly responsive to said first and second coin detector means for generating a valid comparison signal (VCS) only if the strength of the detected coin deposit signals is within a predetermined range, and logic means responsive to said first and second detector means and to said signal comparator means for indicating a valid coin (V) has been detected where $V = (CTD1)(VCS) + (\overline{CDT1}) + (CTD2)$ and for indicating a fraudulent coin (F) has been detected where $F = (CTD1)(\overline{VCS})$.

11. In a telephone system wherein a calling coin station and a called station communicate over a communication path therebetween, signals from the calling station generally traveling in a first direction over the communication path to the called station and signals from the called station generally traveling in a second opposite direction over the communication path to the calling station, the combination comprising:

first coin detector means connected to said communication path to receive the signals traveling thereover in one direction for detecting a coin deposit signal, second coin detector means connected to said communication path to receive the signals traveling in both directions over said communication path for detecting a coin deposit signal, signal comparison means responsive to said first and second coin detector means for indicating whether or not the strength of detected coin deposit signals is within a predetermined range, and logic means jointly responsive to said first and second coin detector means and to said signal comparison means for indicating whether a detected coin deposit signal is a valid coin deposit signal from the calling station or a fraudulent coin deposit signal from the called station.

12. In a telephone system wherein a calling coin station and a called station are interconnected and communicate over this interconnection, at least a portion of the interconnection including a first unidirectional path conveying signals from the calling station to the called station and a second unidirectional path conveying signals from the called station to the calling station, the combination comprising:

bridge circuitry connected to said first and second unidirectional paths for applying the signals received over both said paths to a combined path, first and second coin tone detectors respectively providing first (CTD1) and second (CTD2) coin tone present signals upon detection of a coin deposit signal, network means, during a coin deposit interval, for connecting said first unidirectional path to said first coin tone detector and for connecting said combined path to said second coin tone detector, signal comparator logic connected to said first and second coin tone detectors for providing a valid Comparison signal (VCS) if the signal strength of a detected coin deposit signal is within a predetermined range, and logic means responsive to said coin tone detectors and said signal comparator logic for providing a valid coin indication V where $V = (CTD1)(VCS) + (\overline{CTD1})(CTD2)$ and for providing a fraudulent coin indication F where $F = (CTD1)(\overline{VCS})$.

13. In the telephone system according to claim 12, said combination further comprising:

announcing means for providing announcements, first and second hybrid circuits interconnected by third and fourth unidirectional paths, said first hybrid circuit being connected to said combined path via said network and said second hybrid circuit being connected to said announcing means, said first hybrid conveying signals received over said combined path to said second hybrid circuit via said third unidirectional path and said second hybrid circuit conveying announcements from said announcing means to said first hybrid via said fourth unidirectional path, and wherein said second coin tone detector is connected to said combined path via said third unidirectional path, said first hybrid circuit and said network, and wherein said bridge circuitry also applies announcements received over said combined path from said second hybrid circuit, said fourth unidirectional path said first hybrid circuit, and said networks to both said first and second unidirectional paths.

14. In a telephone system including a local switching office and another switching office interconnecting a calling and a called station, first detecting means for detecting coin deposit tones being conveyed over the interconnection from the calling station to the called station, second detecting means for detecting coin deposit tones being conveyed over the interconnection from the called station to calling station, logic means jointly responsive to said first and second detecting means for comparing the signal strengths of a detected coin deposit tone to determine if one of said detecting means detected a tone reflected back from one of the switching offices, and means jointly responsive to said first and second detecting means and to said comparing means for indicating whether the detected coin deposit tone is a valid coin deposit tone from the calling station or a fraudulent tone from the called station.

* * * * *

UNITED STATES PATENT AND TRADEMARK OFFICE
CERTIFICATE OF CORRECTION

PATENT NO. : 4,046,962
DATED : September 6, 1977
INVENTOR(S) : Barry W. Rogers

It is certified that error appears in the above-identified patent and that said Letters Patent are hereby corrected as shown below:

Column 6, line 56, delete first occurrence "the".
Column 7, line 36, "(NT)" should read --($\overline{N1}$)--; line 42, "B2" should read --BZ--. Column 10, line 18, "the" should read --then--; line 28, "S2" should read --D2--. Column 11, line 35, "hydrid" should read --hybrid--. Column 12, line 26, "indication S" should read --indications--. Column 14, line 39, "announcement" should read --announcements--. Column 15, line 51, second occurrence "first" should read --second--; line 53, "second" should read --first--. Column 16, line 3, "Comparison" should read --comparison--; line 25, delete "second" and insert --first--; line 31, after "path" insert a comma; line 32, "networks" should read --network--; line 43, before "means" delete "logic"; line 48, before "means" insert --logic--.

Signed and Sealed this

Twelfth Day of August 1980

[SEAL]

Attest:

Attesting Officer

SIDNEY A. DIAMOND

Commissioner of Patents and Trademarks